Nov. 21, 1967   H. N. BOL...
ELASTIC EXTENSION DEVICE
Filed May 26, 1965
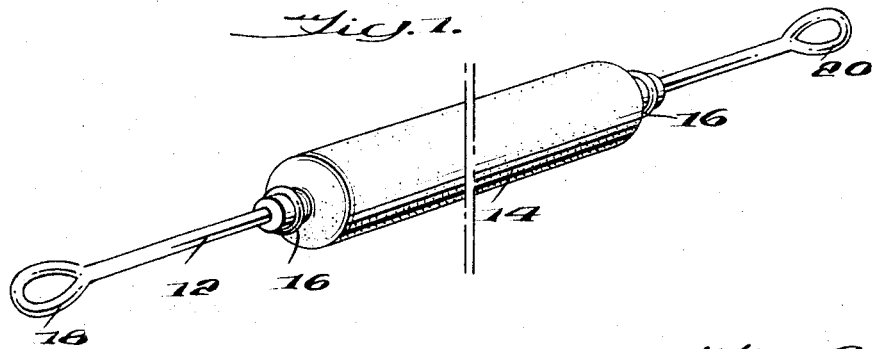
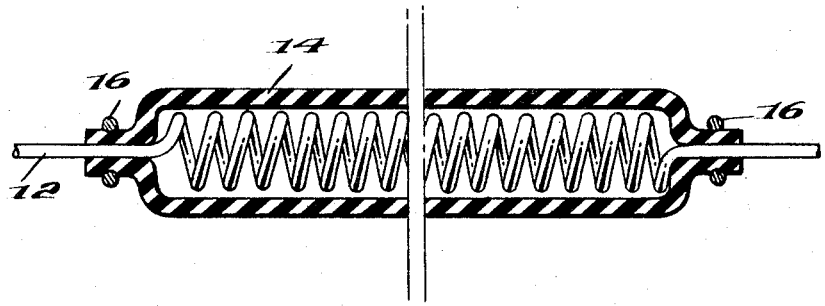
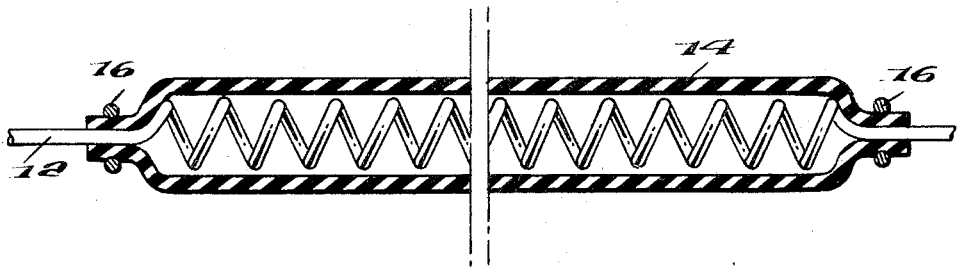
INVENTOR
HAROLD N. BOLLINGER,
BY McLean, Morton & Boustead
ATTORNEYS

# United States Patent Office 3,353,817
Patented Nov. 21, 1967

3,353,817
ELASTIC EXTENSION DEVICE
Harold N. Bollinger, 818 Woodhaven Drive,
Richmond, Va. 23224
Filed May 26, 1965, Ser. No. 458,946
2 Claims. (Cl. 267—69)

ABSTRACT OF THE DISCLOSURE

A rope take-up and shock absorber consisting essentially of a flexible, non-resilient rope and a resilient sleeve surrounding the rope, the portion of the rope within the sleeve being tightly coiled with the coils substantially filling the interior of the sleeve, and pressure clamp ring means for tightly securing the ends of the sleeve to the rope at each end of the coiled portion thereof with the sleeve under a small amount of tension whereby the sleeve normally tends to maintain the rope portion in its coiled position.

---

The present invention relates to a take-up apparatus and shock absorber for use with ropes, cables, and the like, and particularly with safety belts, tow ropes or chains, painters for tying up boats, etc.

In general, the apparatus of this invention includes a sleeve of a resilient material such as rubber or a resilient plastic which has snugly fitted therein a tightly coiled section of a flexible rope, cable or the like, the ends of which extend beyond the sleeve. The sleeve with the coiled section of rope, cable or the like, snugly contained therein is securely fastened at each end to the rope, cable or the like when in its non-stretched position by ring clamps or the like. Preferably, the rope, cable or the like is non-resilient. Hereinafter, this invention will be described with reference to a rope, however it is to be understood that this term as used in this specification and the appended claims is intended to include flexible cable, wire, etc. The number of coils which may be used will vary depending upon use of the device, the length of rope, cable or the like required, the amount of cushioning desired, etc. A particularly convenient construction is one where the ends of the rope extend out of the sleeve a few inches and form means, i.e. loops, adapted for connecting the rope to another rope or a securing place.

A primary object of the present invention is to provide a safety device for a workman in high places that can be used in conjunction with a safety device designed to protect the workman from dangerous falls and which is so constructed as to keep the space around a workman's feet clear of rope, cable or the like that forms a part of the safety device and to cushion any shock on the workman through the application of a sudden force on the device through, for example, a fall by the workman. When a force is applied through the device of this invention, the coiled section in the sleeve unwinds as the force stretches the resilient sleeve and the resilient sleeve cushions the force as it is applied so that the shock experienced when the rope is taut is cushioned. Upon release of the force between the two ends of the rope, the sleeve returns to its normal size and the rope automatically recoils in the sleeve to take up slack in the rope.

Other objects and advantages reside in the details of construction and operation as more fully hereinafter described and claimed, reference being had to the accompanying drawings wherein like numerals refer to like parts throughout, and in which;

FIGURE 1 is a plan view of the device of this invention;

FIGURE 2 is a sectional view of the device of this invention; and,

FIGURE 3 is a sectional view of the invention as in FIGURE 2 with the rope extended.

Referring now to FIGURE 1, this invention consists of rope 12 and resilient sleeve 14 of, for example, rubber. The rope 12 is tightly coiled, see FIGURE 2, in the sleeve 14 when the sleeve is its normal size and the sleeve is secured at each end to the rope, for example, by pressure rings 16, with the coil snugly contained therein. Preferably, a small amount of tension is applied on the sleeve 14 when it is secured to the rope 12 by rings 16 to insure a snug fit for the coil. The two ends of the rope can be formed into coupling rings 18 and 20, shown in FIGURE 1, if desired. Rope 12 is flexible and preferably non-resilient, and is tightly coiled in sleeve 14. In operation, when a force is applied on the rope 12 between the ends 18 and 20, the sleeve 14 is stretched as the coiled section unwinds, see FIGURE 3, to cushion the force as it is applied between the ends 18 and 20, and, accordingly, the shock experienced when the rope is fully extended. When the force is removed, the sleeve 14 returns to its normal size and, due to the snug fit of the coil in the sleeve in its normal size, the rope 12 automatically recoils inside the sleeve. In a practical use of the present invention, an assembly such as illustrated in FIGURE 1 including a sleeve and a cable, rope or the like is used as a safety rope for window washers on tall buildings with one end attached to the building structure and the other end to a belt or the like that will be placed about the user's waist.

Having described the invention, what is claimed is:

1. A rope take-up and shock absorber consisting essentially of a flexible, non-resilient rope and a resilient sleeve surrounding said rope, the portion of said rope within said sleeve being tightly coiled with the coils substantially filling the interior of said sleeve, and pressure clamp ring means tightly securing the ends of said sleeve to said rope at each end of the coiled portion thereof with the sleeve under a small amount of tension whereby said sleeve normally tends to maintain said portion in its coiled position.

2. The take-up and absorber of claim 1 wherein said sleeve is rubber.

References Cited

UNITED STATES PATENTS 1,296,057   3/1919   Ellsworth.
2,117,322   5/1938   Hillman _____ 267—69
2,991,524   7/1961   Dobrikin _____ 267—69

ARTHUR L. LA POINT, Primary Examiner.
R. M. WOHLFARTH, Assistant Examiner.